United States Patent
Wang

(10) Patent No.: US 8,818,366 B2
(45) Date of Patent: Aug. 26, 2014

(54) METHOD FOR BASE STATION TO OBTAIN RADIO CAPABILITY INFORMATION OF USER EQUIPMENT IN LONG TERM EVOLUTION SYSTEM

(75) Inventor: Xintai Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 41 days.

(21) Appl. No.: 13/140,008

(22) PCT Filed: Oct. 15, 2009

(86) PCT No.: PCT/CN2009/074475
§ 371 (c)(1),
(2), (4) Date: Dec. 14, 2011

(87) PCT Pub. No.: WO2010/069200
PCT Pub. Date: Jun. 24, 2010

(65) Prior Publication Data
US 2011/0256855 A1    Oct. 20, 2011

(30) Foreign Application Priority Data

Dec. 16, 2008    (CN) .......................... 2008 1 0239950

(51) Int. Cl.
H04W 4/00    (2009.01)
H04W 8/24    (2009.01)
(52) U.S. Cl.
CPC ...................................... H04W 8/24 (2013.01)
USPC ......................... 455/435.1; 455/418; 455/436
(58) Field of Classification Search
USPC .......................... 455/414, 432, 435, 436–444; 370/328–338
See application file for complete search history.

(56) References Cited

U.S. PATENT DOCUMENTS

| 2007/0224988 A1* | 9/2007 | Shaheen | 455/436 |
| 2009/0170426 A1* | 7/2009 | Jung et al. | 455/7 |
| 2011/0117916 A1* | 5/2011 | Dahlen | 455/436 |

FOREIGN PATENT DOCUMENTS

| CN | 101179847 A | 5/2008 |
| CN | 101179858 A | 5/2008 |
| CN | 101272521 A | 9/2008 |
| RU | 2316149 C2 | 1/2008 |
| RU | 2007105980 A | 8/2008 |
| WO | 2007111860 A2 | 10/2007 |

OTHER PUBLICATIONS

English Translation of the Written Opinion of the International Search Authority in international application No. PCT/CN2009/074475, mailed on Jan. 21, 2010.

(Continued)

Primary Examiner — Kashif Siddiqui
(74) Attorney, Agent, or Firm — Oppedahl Patent Law Firm LLC

(57) ABSTRACT

A method for a base station to obtain radio capability information of a User Equipment (UE) in long term evolution system comprises that: a mobility management entity sends an initial context setup request message to the base station, and the base station determines whether the received initial context setup request message contains an Information Element (IE) of forbidden inter radio access technologies; when contains, the base station writes the radio access technology types which are not included in the IE of forbidden inter radio access technologies into a query message, and sends the query message to the UE; otherwise, the base station writes all radio access technologies supported by protocol into a query message and sends the query message to the UE; after receiving the query message, the UE sends the UE radio capability information of radio access technologies supported by the UE itself to the base station. The above method avoids the blindness of writing query message for the base station, which reduces the overhead of the air interface, thereby shortens the connection delay of the UE in the long term evolution system.

8 Claims, 2 Drawing Sheets

(56) References Cited

OTHER PUBLICATIONS

International Search Report in international application No. PCT/CN2009/074475, mailed on Jan. 21, 2010.
Technical Specification Group Radio Access Network, Nov. 2007.
Transfer of UE Radio Access Capability through S1, Feb. 15, 2008.
Piggyback of the UE radio capability IE in the InitialContext Setup Response, Nov. 14, 2008.
Supplementary European Search Report in European application No. 09832882.6, mailed on Apr. 12, 2012.

* cited by examiner

METHOD FOR BASE STATION TO OBTAIN RADIO CAPABILITY INFORMATION OF USER EQUIPMENT IN LONG TERM EVOLUTION SYSTEM

TECHNICAL FIELD

The invention relates to a technology of obtaining information in long term evolution (LTE) system of mobile communications in the 3rd Generation Partnership Project (3GPP), especially to a method for a base station to obtain radio capability information of a User Equipment (UE) in LTE system.

BACKGROUND

In the LTE system, because there is only packet switching (PS) domain, voice services are carried by the Internet Protocol (IP), which is strict in requirement for time delay. The time for the UE to transit from idle state to active state cannot be more than 100 milliseconds, thereby making a strict requirement for design of the whole LTE system. In the LTE system, the process that the base station, i.e., Evolution Node B (eNB) obtains UE radio capability information is one of the important processes in the process that the UE transits from idle state to active state, so the time delay of the process of obtaining the radio capability information of UE is also one of the important influence factors of the time delay of the whole afore-mentioned process.

FIG. 1 illustrates a diagram of interface relationship among UE, eNB and Mobility Management Entity (MME) in the LTE system; as shown in FIG. 1, the interface between the UE and the eNB is UU interface which is a radio interface; the interface between the eNB and the MME is S1 interface which is a wire interface; the MME is an entity of the Core Network (CN).

The UE radio capability information comprises system supported by the UE (which means radio technology), frequency range, protocol edition, radio frequency capability, measurement capability, physics layer capability and so on; and different systems have different capabilities. At present, the radio capabilities of UE comprise EUTRA capability (see the detailed definition in TS36.331), UTRAN capability (see the detailed definition in TS25.331), GERAN capability (see the detailed definition in TS24.008 and TS44.018).

In the LTE system, there are two methods for eNB to obtain the UE radio capability information.

First method: when the UE radio capability information has been stored in the MME, the MME includes the UE radio capability information in the initial context setup request message sent to the eNB, and the eNB stores the UE radio capability information after receiving the initial context setup request message.

Second method: when no UE radio capability information is stored in the MME, the initial context setup request message sent to the eNB contains no UE radio capability information, which triggers the eNB to send the UE a query message of the UE radio capability information, called query message for short. The querying method is specifically that: the eNB sends a query message to the UE, the UE sends the UE radio capability information of corresponding access technology to the eNB according to the access technology type contained in the query message, and then the eNB stores the UE radio capability information and sends the UE radio capability information to the MME.

In the second method above, the triggering part which triggers the eNB to query the UE about radio capability is the MME; since both the MME and the eNB do not know which radio access technology the UE supports, when querying the radio capability with the UE, the eNB does not know which radio access technology type should be written, which causes the eNB to be in blindness state when querying the radio capability with the UE. The method adopted in the prior art is including all radio access technology types supported by protocol in the query message. However, with the development of radio technologies, there will be more and more access technology types, so more and more access technology types are needed to be included in the query message. Since the UE radio capability information of each access technology is relatively large, usually taking up dozens of bytes, the more the queried access technology types are, the more the UE capability information sent by the UE to the eNB is, which increases the overhead of the air interface, and thereby directly influencing the connection delay of the UE.

SUMMARY

An aspect of the invention is to provide a method for eNB to obtain radio capability information of a UE in LTE system, which can reduce the overhead of the air interface and thereby shorten the connection delay of the UE in LTE system.

To attain the purpose above, the technical solution of the present invention is detailed as follows.

A method for a base station to obtain radio capability information of a UE in LTE system is provided. Wherein a Mobility Management Entity (MME) sends an initial context setup request message to the base station, and the method comprises that:

the base station determines whether the received initial context setup request message contains an Information Element (IE) of forbidden inter radio access technologies; when contains, the base station writes the radio access technology types, which are not included in the IE of forbidden inter radio access technologies, into a query message, and sends the query message to the UE; otherwise, the base station writes all radio access technologies supported by protocol into a query message and sends the query message to the UE;

the UE sends the UE radio capability information of radio access technologies supported by the UE itself to the base station after receiving the query message.

The method further comprises that, before the base station determines whether the received initial context setup request message contains the IE of forbidden inter radio access technologies , the base station determines whether the received initial context setup request message contains UE radio capability information; when contains, the base station stores the UE radio capability information, and the process of obtaining the radio capability information of UE is over; otherwise, the base station determines whether the received initial context setup request message contains the IE of forbidden inter radio access technologies.

The method further comprises that the base station stores the UE radio capability information sent by the UE, and sends the UE radio capability information to the MME; the MME sends the context setup request message to the base station according to an activation request from the UE.

wherein, the activation request is a registration request from the UE or a call request from the UE. The UE is a mobile phone, a wireless local area network card or a vehicle-mounted radio station.

wherein, the radio access technologies are Evolved Universal Terrestrial Radio Access (EUTRA), Universal Terrestrial Radio Access Network (UTRAN), and/or Global System For Mobile Communications (GSM)/Enhanced Data Rates For GSM Evolution (EDGE) radio access network (GE-RAN).

Compared with the existing method, in the method for eNB to obtain the radio capability information of UE in LTE system provided by the present invention, when the initial context setup request message sent by the MME includes an IE of forbidden inter radio access technologies, the eNB writes the radio access technologies, which are not included in the IE of forbidden inter radio access technologies, in the query message. Therefore, the number of radio access technology types included in the query message is reduced, which optimizes the UE radio capability information sent from the eNB to the UE, avoids the blindness that the eNB writes the access technologies supported by the UE, reduces the overhead of the air interface, thereby shortening the connection delay of the UE in the LTE system.

DETAILED DESCRIPTION

The main idea of the present invention is that: when the eNB sends a query message to a UE to obtain the UE radio capability information, if the initial context setup request message sent by an MME includes the IE of forbidden inter radio access technologies, the eNB only writes radio access technology types, which are not included in the IE of forbidden inter radio access technologies, in the query message, and sends the query message to the UE; according to the radio access technology types included in the query message, the UE sends the eNB the UE radio capability information of radio access technologies supported by the UE itself. Compared with the query message in the prior art which includes all the radio access technology types supported by protocol, the eNB in the present invention has pertinence when obtaining the UE radio capability information, which reduces the overhead of air interface, thereby shortens the connection delay of the UE.

The UE in the present invention may be a mobile phone, a Wireless Local Area Network (WLAN) card, a vehicle-mounted radio station, etc.

Figure 1:
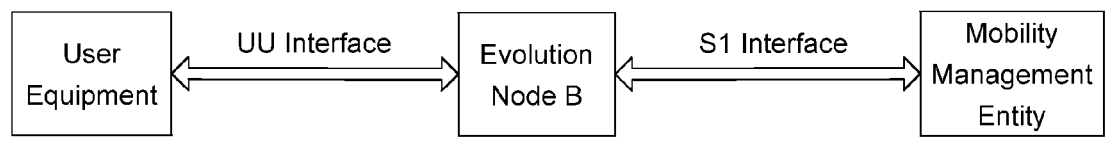
FIG. 1 illustrates a diagram of interface relationship among UE, eNB and MME.
Figure 2:
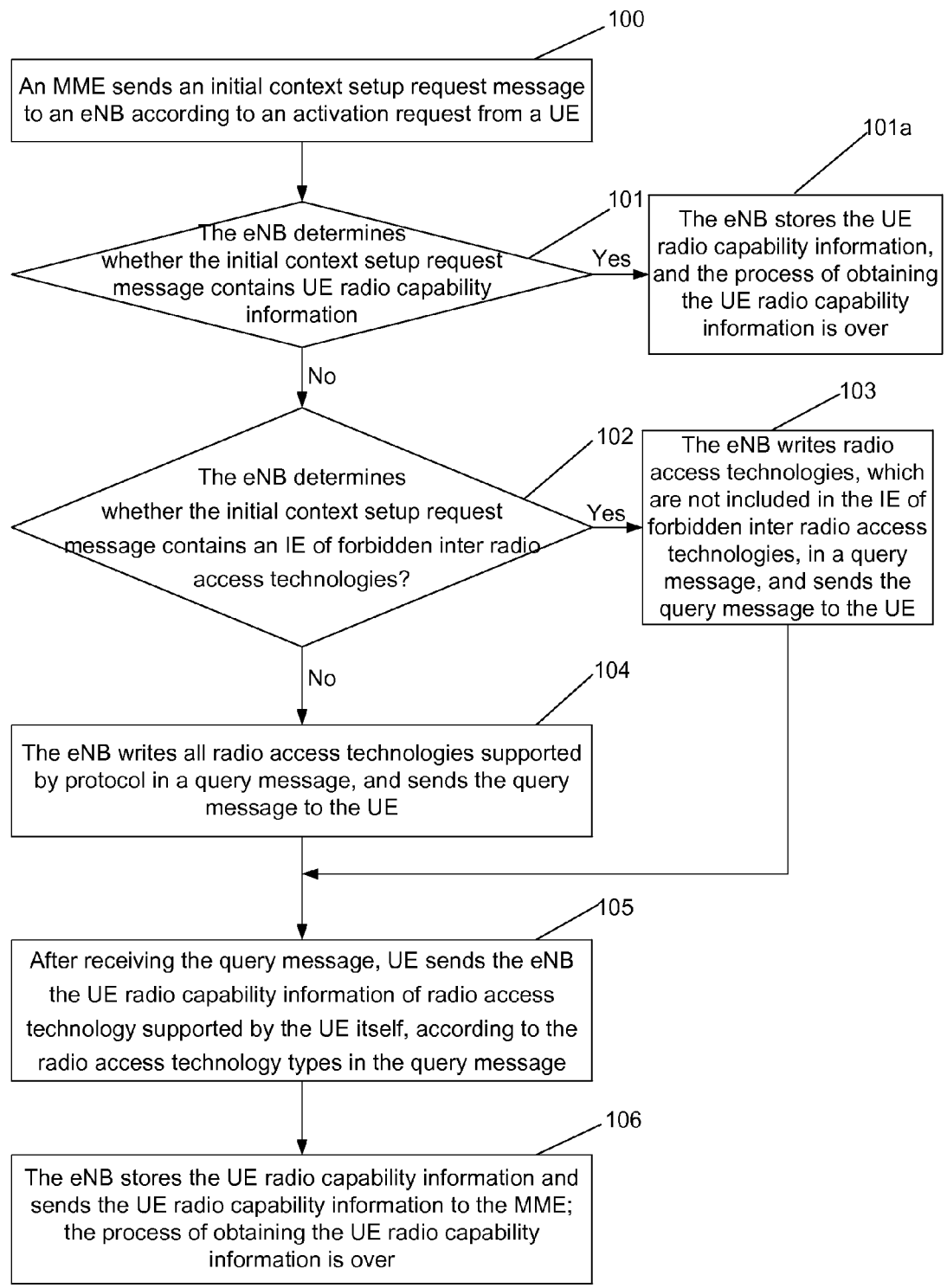
FIG. 2 illustrates a flowchart of a method for eNB to obtain radio capability information of a UE in the present invention.

FIG. 2 illustrates a flowchart of the method for eNB to obtain radio capability information of the UE, as shown in FIG. 2, the method comprises the following steps.

Step 100: An MME sends an initial context setup request message to an eNB according to an activation request from a UE.

In this step, the MME may include a handover restriction related IE, which is called handover restriction list, in the initial context setup request message according to the network configuration of the Core Network (CN); the above IE may further include an IE which is called IE of Forbidden Inter Radio Access Technologies (Forbidden Inter RATs); the IE of forbidden inter radio access technologies includes the types of networks which the MME forbids the UE to be handed over to. The IE of forbidden inter radio access technologies is mainly used for forbidding the UE to be handed over to the network listed by the IE.

Step 101: The eNB determines whether the initial context setup request message contains UE radio capability information; when contains, the eNB stores the UE radio capability information at step 101a, and the process of obtaining the UE radio capability information is over; when no UE radio capability information is contained, executing Step 102.

Step 102: The eNB determines whether the initial context setup request message contains an IE of forbidden inter radio access technologies; when contains, executing Step 103; otherwise, executing Step 104.

Step 103: The eNB writes radio access technology types, which are not included in the IE of forbidden inter radio access technologies, in a query message, and sends the query message to the UE, then executing Step 105;

in this step, when the initial context setup request message includes a handover restriction list, and the handover restriction list includes the IE of forbidden inter radio access technologies, deleting the radio access technology types included in the IE of forbidden inter radio access technologies from the list of all radio access technologies supported by protocol to obtain a new radio access technology type list; the query message includes radio access technology type (RAT-TYPE) field; the radio access technology types in the obtained new radio access technology type list are written in the RAT-TYPE field of the query message.

Step 104: The eNB writes all radio access technologies supported by protocol in a query message, and sends the query message to the UE, then executing Step 105;

in this step, when the initial context setup request message includes no handover restriction list, or includes a handover restriction list but the handover restriction list includes no IE of forbidden inter radio access technologies, the eNB writes all radio access technologies supported by protocol in the RAT-TYPE field of the query message.

Step 105: After receiving the query message, the UE sends the eNB the UE radio capability information of radio access technologies supported by the UE itself according to the radio access technology types in the query message;

in this step, if the UE does not support some radio access technology in the query message, the UE does not organize and send the UE radio capability information of this radio access technology.

Step 106: The eNB stores the UE radio capability information and sends the UE radio capability information to the MME; the process of obtaining the UE radio capability information is over.

The method for eNB to obtain the radio capability information of a mobile phone in LTE system is described below with reference to the embodiments.

Embodiment 1

Taking an Attach process in starting process of a mobile phone as example, in the process, the MME stores no radio capability information of the mobile phone. The mobile phone sends a registration request to the MME; after receiving the registration request, the MME sends an initial context setup request message to the eNB. When the eNB determines the initial context setup request message contain no radio capability information of the mobile phone, the eNB is triggered to send a query message to the mobile phone to obtain the radio capability information of the mobile phone. The method for the eNB to obtain the radio capability information of the mobile phone in the embodiment comprises the following steps.

Step 1: After receiving the registration request, the MME sends an initial context setup request message to the eNB through an S1 interface.

Step 2: The eNB determines whether the initial context setup request message contains the radio capability information of the mobile phone; when contains, the eNB stores the radio capability information of the mobile phone, and the process of obtaining the radio capability information of the mobile phone is over; otherwise, executing Step 3.

Step 3: The eNB determines whether the initial context setup request message contains an IE of forbidden inter radio access technologies; when contains, executing Step 4; otherwise, executing Step 5.

Step 4: The eNB writes the radio access technology types, which are not included in the IE of forbidden inter radio access technologies, in a query message, and sends the query message to the mobile phone, and then executing Step 6;

for example, the existing radio access technology types comprise the evolved universal terrestrial radio access (EUTRA) of LTE system, the universal terrestrial radio access network of 3G system, the GSM/EDGE radio access network (GERAN) based on global system for mobile communicates/enhanced data rates for GSM evolution, etc. In TS 36.331, values, corresponding to set {EUTRA, UTRAN, GERAN}, in the IE of radio access technology type of the UE radio capability information are {0, 1, 2}.

When the IE of forbidden inter radio access technologies is {GERAN}, deleting the GERAN from the protocol-defaulted set of radio access technologies {EUTRA, UTRAN, GERAN} to obtain set {EUTRA, UTRAN}, i.e., {0, 1}, a new set of radio access technologies, and writing {0, 1} in the RAT-TYPE field of the query message. When the IE of forbidden inter radio access technologies is {all}, i.e., forbidding handover among different networks and just supporting the LTE system, deleting the GERAN and UTRAN from the protocol-defaulted set of radio access technologies {EUTRA, UTRAN, GERAN} to obtain a new set {EUTRA}, and writing the corresponding value {0} in the RAT-TYPE field of the query message.

Step 5: The eNB writes all radio access technologies supported by protocol in the query message, and sends the query message to the mobile phone, then executing Step 6;

in this step, the set of radio access technologies {EUTRA, UTRAN, GERAN} comprises all radio access technologies supported by protocol; the eNB writes the corresponding values {0, 1, 2} in the RAT-TYPE field of the query message, and sends the query message to the mobile phone through UU interface.

Step 6: According to the radio access technologies in the query message, the mobile phone sends the supported radio capability information of the mobile phone to the eNB through a UU interface;

in this step, if the mobile phone does not support some radio access technology in the query message, the mobile phone does not organize and send the radio capability information of the mobile phone of the radio access technology. In this embodiment, if mobile phone only supports the EUTRA technology, the mobile phone would only organizes and writes the EUTRA radio access technology in the radio capability information of the mobile phone, and then sends the radio capability information of the mobile phone to the eNB through the UU interface.

Step 7: the eNB stores the radio capability information of the mobile phone sent by the mobile phone, and sends the radio capability information to the MME through an 51 interface; the process of obtaining the radio capability information of the mobile phone is over.

Embodiment 2

Taking a common call process of a mobile phone as example, in the starting process of the mobile phone, the MME has stored the radio capability information of the mobile phone. The mobile phone sends a call request to the MME in the process of making a dialing call of the mobile phone; after receiving the call request, the MME sends an initial context setup request message to the eNB. The eNB determines the initial context setup request message contains the radio capability information of the mobile phone, and stores the radio capability information of mobile phone. The process of obtaining the radio capability information of the mobile phone is over.

If the abnormity of the CN makes the MME lose the radio capability information of the mobile phone at the beginning of call, the initial context setup request message sent from the MME to the eNB does not contain the radio capability information of the mobile phone, which triggers the eNB to query the mobile phone about the radio capability information of the mobile phone; the specific query method is the same as that in embodiment 1.

Embodiment 3

Taking a process of registering on Internet of a WLAN card as example, a user of the WLAN card uses a portable computer to perform wireless Internet access; when the user registers through the WLAN card, the WLAN card also needs to perform an Attach process. In the process, the WLAN card sends a registration request to the MME; after receiving the registration request, the MME sends an initial context setup request message to the eNB; if the initial context setup request message does not contain the radio capability information of the WLAN card, the eNB is triggered to query the WLAN card about the radio capability information of the WLAN card. The specific query method is the same as that in embodiment 1.

Embodiment 4

Taking a process of registering on Internet wirelessly or voice call of a vehicle-mounted radio station as example, when a user of the vehicle-mounted radio station turns on the power to perform user registration, the vehicle-mounted radio station also performs an Attach process; in the Attach process or the process of performing voice call by vehicle-mounted radio station, the vehicle-mounted radio station sends a registration request or a call request to the MME; after receiving the registration request or the call request, the MME sends an initial context setup request message to the eNB; if the initial context setup request message sent from the MME to the eNB contains the radio capability information of the vehicle-mounted radio station, the eNB stores the radio capability information of the vehicle-mounted radio station, and the process of obtaining the radio capability information of vehicle-mounted radio station is over; if the initial context setup request message sent from MME to eNB does not contain the radio capability information of vehicle-mounted radio station, the eNB is triggered to query the vehicle-mounted radio station about the radio capability information of the vehicle-mounted radio station. The specific query method is the same as that in embodiment 1.

The above is only the preferred embodiment of the invention and not intended to limit the scope of protection of the invention.

What is claimed is:

1. A method for a base station to obtain radio capability information of a User Equipment (UE) in a Long Term Evolution (LTE) system, comprising:
    determining, by the base station, whether an initial context setup request message from a Mobility Management Entity (MME) contains an Information Element (IE) of forbidden inter radio access technologies;
    when it determined that the IE of forbidden inter radio access technologies is contained, writing, by the base station, radio access technology types, which are not included in the IE of forbidden inter radio access technologies, into a query message of UE radio capability information according to the IE of forbidden inter radio access technologies;

sending, by the base station, the query message of UE radio capability information to the UE; and sending, by the UE, UE radio capability information of radio access technologies supported by the UE itself to the base station according to the radio access technology types in the query message of UE radio capability information;

wherein the query message includes radio access technology type (RAT-TYPE) field, and the writing radio access technology types, which are not included in the IE of forbidden inter radio access technologies, into a query message comprises:

deleting the radio access technology types included in the IE of forbidden inter radio access technologies from the list of all radio access technologies supported by protocol to obtain a new radio access technology type list; and writing the radio access technology types in the obtained new radio access technology type list in the RAT-TYPE field of the query message.

2. The method according to claim 1, further comprising: before the base station determines whether the received initial context setup request message contains the IE of forbidden inter radio access technologies, the base station determining whether the received initial context setup request message contains UE radio capability information; when contains, the base station storing the UE radio capability information, and the process of obtaining the UE radio capability information being over; otherwise, the base station determining whether the received initial context setup request message contains the IE of forbidden inter radio access technologies.

3. The method according to claim 2, further comprising: the base station storing the UE radio capability information sent by the UE, and sending the UE radio capability information to the MME.

4. The method according to claim 3, wherein the UE is a mobile phone, a wireless local area network card or a vehicle-mounted radio station.

5. The method according to claim 1, wherein the radio access technologies are Evolved Universal Terrestrial Radio Access (EUTRA), Universal Terrestrial Radio Access Network (UTRAN), and/or Global System For Mobile Communications (GSM)/Enhanced Data Rate for GSM Evolution (EDGE) Radio Access Network (GERAN).

6. The method according to claim 2, wherein the radio access technologies are Evolved Universal Terrestrial Radio Access (EUTRA), Universal Terrestrial Radio Access Network (UTRAN), and/or Global System For Mobile Communications (GSM)/Enhanced Data Rate for GSM Evolution (EDGE) Radio Access Network (GERAN).

7. The method according to claim 3, wherein the radio access technologies are Evolved Universal Terrestrial Radio Access (EUTRA), Universal Terrestrial Radio Access Network (UTRAN), and/or Global System For Mobile Communications (GSM)/Enhanced Data Rate for GSM Evolution (EDGE) Radio Access Network (GERAN).

8. The method according to claim 4, wherein the radio access technologies are Evolved Universal Terrestrial Radio Access (EUTRA), Universal Terrestrial Radio Access Network (UTRAN), and/or Global System For Mobile Communications (GSM)/Enhanced Data Rate for GSM Evolution (EDGE) Radio Access Network (GERAN).

* * * * *